US006781991B1

(12) United States Patent
Anderlind

(10) Patent No.: US 6,781,991 B1
(45) Date of Patent: Aug. 24, 2004

(54) METHOD AND APPARATUS FOR MONITORING AND SELECTIVELY DISCOURAGING NON-ELECTED TRANSPORT SERVICE OVER A PACKETIZED NETWORK

(75) Inventor: Erik Einar Anderlind, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/258,825

(22) Filed: Feb. 26, 1999

(51) Int. Cl.[7] .............................................. H04L 12/54
(52) U.S. Cl. .................................. 370/394; 370/395.21
(58) Field of Search ................................. 370/229, 230, 370/238, 902, 218, 260, 261, 313, 352, 353, 360, 386, 389, 392, 395.21, 395.52, 473, 394; 709/203, 235

(56) References Cited

U.S. PATENT DOCUMENTS

| | | | | |
|---|---|---|---|---|
| 5,367,523 A | * | 11/1994 | Chang et al. ............... | 370/235 |
| 5,524,006 A | * | 6/1996 | Hluchyj et al. ............. | 370/233 |
| 5,623,492 A | | 4/1997 | Teraslinna ................... | 370/347 |
| 5,706,279 A | | 1/1998 | Teraslinna ................... | 370/232 |
| 5,826,029 A | * | 10/1998 | Gore, Jr. et al. ............ | 709/203 |
| 5,828,653 A | * | 10/1998 | Goss .......................... | 370/230 |
| 5,903,558 A | * | 5/1999 | Jones et al. ................. | 370/351 |
| 6,160,804 A | * | 12/2000 | Ahmed et al. .............. | 370/349 |
| 6,256,300 B1 | * | 7/2001 | Ahmed et al. .............. | 370/331 |
| 6,282,208 B1 | * | 8/2001 | Bowcutt et al. ............ | 370/486 |
| 6,331,970 B1 | * | 12/2001 | Nieh et al. .................. | 370/230 |
| 6,421,350 B1 | * | 7/2002 | Szurkowski et al. ........ | 370/419 |
| 6,529,475 B1 | * | 3/2003 | Wan et al. ................... | 370/231 |

OTHER PUBLICATIONS

"Real Time Voice Over Packet–Switched Networks", by Kostas et al., IEEE Network, Jan./Feb. 1998 pp. 18–27.

"Port number" printed http://whatis.com/portnumb.htm, Feb. 10, 1999, copyright 1996.

"Sniffer", printed http://whatis.com/sniffer.htm, printed Jan. 25, 1999, copyright 1997.

"Router", printed http://webopedia. internet.com/TERM/r/router.html, printed Jan. 25, 1999 copyright 1998.

"Router" http://whatis.com/router.htm, printed Jan. 25, 1999 copyright 1996–99.

(List continued on next page.)

*Primary Examiner*—Dang Ton
*Assistant Examiner*—Phuc Tran

(57) ABSTRACT

A method, device, and software, for monitoring whether use of a packetized network is commensurate with a preexisting transport service election designated for a user, is disclosed. Also, a method, device and software for selectively discouraging such non-compliant use is disclosed. Packets associated with a user are received and at least one parameter of the packets or an absence of such a parameter, which is indicative of a transport service required by the packets, is inspected. Packets for which the required transport service does not comply with the preexisting service election are identified. If desired, the arrival of the non-compliant packets is selectively delayed by a duration sufficient to degrade the quality of the non-compliant use, which discourages similar non-compliant use. The one or more parameters or absence thereof of the received packets correspond to particular fields within the packet that are indicative of the transport service required by the packet. A typical situation will have a user elect only basic (lower cost) pure-data, i.e., non-real-time packet, transport service. However, the user will transmit and/or receive real-time packets such as voice or video packets. The disclosed invention makes it possible to monitor, and selectively discourage, such non-compliant use, which will encourage election of a higher quality (higher cost) service to avoid similar delays.

34 Claims, 6 Drawing Sheets

OTHER PUBLICATIONS

"Switch" http://whatis.com/switch.htm, printer Jan. 25, 1999 (please note that only page 1 of 2 is being submitted.
"Routing in the Internet", http://scit.wlv.ac.uk/~jphb/comms/iproute.html, printed Jan. 25, 1999.
"Routing", http://www/scit.wlv.ac.uk/~jphb/comms/routing.html, printed Jan. 25, 1999.
"Bridges", http://www.scit.wlv.ac.uk/~jphb/comms/bridges.html, printed Jan. 25, 1999.

* cited by examiner

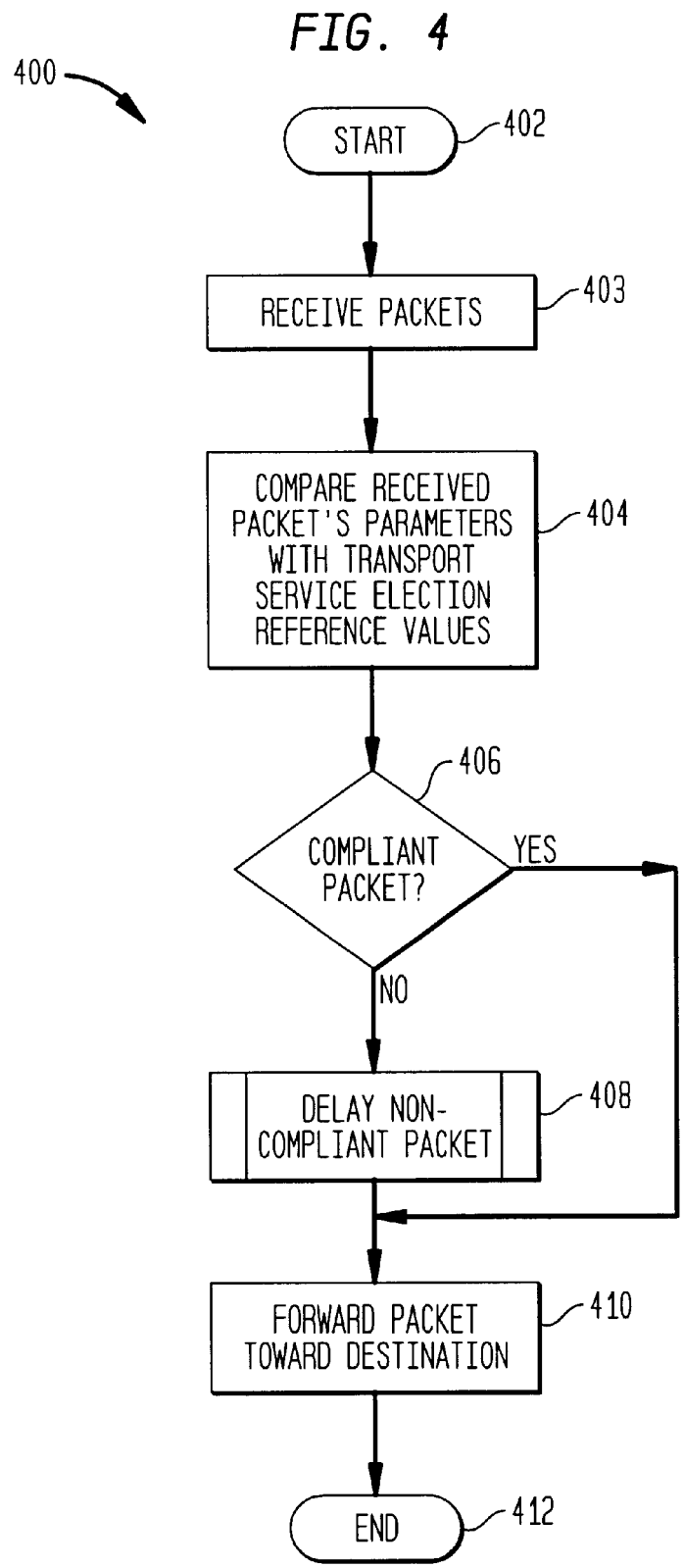

METHOD AND APPARATUS FOR MONITORING AND SELECTIVELY DISCOURAGING NON-ELECTED TRANSPORT SERVICE OVER A PACKETIZED NETWORK

BACKGROUND OF THE INVENTION

1. Field of the Invention

The invention is directed toward the field of packetized networks, and more particularly, to monitoring of the type of transport service requested of a packetized network, and more particularly to the monitoring and selective discouragement of non-elected transport service over a packetized network.

2. Related Art

The recent growth in wide area packetized networks has been dramatic. Two examples of such wide area packetized networks are the various wireless communication technologies and the Internet. An advantage of such packetized networks is that a large variety of information can be transmitted over the same network. For example, pure data files such as electronic mail (E-mail) or interactive world wide web (www) sessions, telephone calls and video images can all be transferred over the Internet.

Much of the packet traffic over a network does not have delay-sensitive content. However, voice packets and video packets are real-time packets. Real-time packets are very sensitive to delay. For voice and video, if more than a few packets are significantly delayed, then the received voice or video transmission is perceptibly (to the user), i.e., degraded in quality.

Some of the routers in packetized networks attempt to treat delay-sensitive packets with a higher priority than delay-tolerant data packets. A user requesting the transport of delay-tolerant data packets is usually unaware or does not care that his packets have been delayed in favor of, e.g., voice or video packets. When the packetized network becomes congested, the differences in delay between preferential and non-preferential packets increase.

Packet networks typically differentiate tariffs based on rate and/or a maximum delay bound or not at all. Currently network operators sell higher value transport services with packet delay guarantees, but have no way of coaxing users to use them when the network is uncongested. Internet access is typically sold either at a flat rate, or based on the transmission bandwidth/modem speed. If users experience low delays for all their traffic, there is no incentive to subscribe or use a higher cost transport service that guarantees lower delays.

So, currently, the cost of access to a packetized network such as the Internet is not affected by the type of packet transport service that a user wishes to request. Someone wishing to use the network for packetized voice transmissions pays the same subscriber fee as someone wishing to transfer files. In other words, a user pays the same amount to transport delay-sensitive packets as delay-tolerant packets. Yet, as discussed above, packetized networks tend to treat these types of packets differently. Still, the user transporting delay-sensitive packets does not pay a premium as compared to the user transporting delay-tolerant packets.

It is known to filter out and prevent some types of packets in a packetized network from reaching their destinations. Firewalls are devices or programs inserted into a network to permanently prevent certain packets from passing through. A firewall decides whether to let a packet pass through or not by inspecting the various header fields contained in a packet. If one would have attempted to adapt firewall technology to discourage use of a network that did not comply with a preexisting service election, then non-compliant packets would have been intercepted and prevented from reaching their destination.

This is so drastic as to undermine the user's confidence in the services of the network provider.

SUMMARY OF THE INVENTION

A first form of the invention is directed toward a method, device, and article of manufacture (software) for monitoring whether the use of a packetized network is commensurate with a preexisting transport service election designated for a user. This embodiment receives packets associated with the user. Such packets have at least one parameter indicative of a transport service selection required by the respective packets or omit a parameter indicative of a required transport service, where the omission also can be considered indicative of the required transport service. After receiving the packets, the embodiment identifies those packets for which the required transport service does not comply with the preexisting transport service election. The identification is preferably performed by comparing the at least one parameter of the received packets with a list of reference values that are representative of the preexisting transport service selection.

A second form of the invention is directed toward a method, device, and article of manufacture (software) for selectively discouraging the use of a packetized network that is not commensurate with a preexisting quality of service selection that has been made by the user. Similar to the first embodiment, this embodiment receives packets associated with the user and determines those packets for which the required quality of service does not comply with the preexisting quality of service selection. The second embodiment then delays arrival of at least some of the non-compliant packets by durations that are sufficient to discourage similar non-compliant use of the packetized network. Compliant packets, e.g., electronic mail (Email) packets, are passed along without delay. For the type of non-compliant transport services being requested, preferably only the minimum number of packets are delayed which are sufficient to produce a user-perceptible degradation in the quality of the service. This minimizes the size of the buffer required. Again, preferably, the determination of non-compliance involves comparing the at least one parameter (or absence thereof) in the received packets with a list of reference values representative of the preexisting transport service election, as well as culling those received packets for which the at least parameter is inconsistent with the list of reference values.

In the second form of the invention, the durations of the delays, respectively, can be determined, e.g., as a function of the required minimum quality of service, and/or as a function of the time (hour and day of the week) at which the non-compliant packets are received, respectively, and/or as a function of a random number, and/or as a function of the instantaneous congestion in the packetized network.

In the second form of the invention, the delay can be implemented by buffering the non-compliant packets in a memory or by intentionally lengthening a route of the non-compliant packets to their respective destinations. An example of intentionally lengthening the route of a non-compliant packet is to send the non-compliant packet through a closed loop at least once.

In the first and second forms of the invention, the at least one parameter of the packet under consideration can correspond to a field of the packet representing the destination address, a field representing a source address, a field representing a mapping to at least one of a source application and a destination application, a field representing a predefined flow of packets, a field representing a type of encapsulated higher level protocol, and a field representing additional protocol options.

In the first and second forms of the invention, the user can be the originator of the received packets or can be the intended recipient of the received packets. In both the first and second embodiments, in addition to identifying packets that are non-compliant, questionable packets are identified. A questionable packet is one for which the compliance of the required transport service selection with the preexisting service selection is indeterminate, e.g., because of encryption. The questionable packets are also delayed by durations sufficient to discourage similar questionable use of the packetized network.

A third form of the invention is also directed toward a method, device and article of manufacture (software) for discouraging use of a packetized network that is not commensurate with a preexisting quality of service election that has been made by a user. Packets are received and it is determined which of the received packets are associated with the user. The arrival of at least a predetermined fraction, if not all, of the packets associated with the user is delayed, again, to discourage use that could be affected by such delay. The delay is not so great as to degrade basic service.

An advantage of the present invention is that it presents a technology that network service providers can use to police or to selectively encourage compliance with the quality of service elected by a user. As such, the packetized network service providers can price their services at different rates per type of service used or consumed by the user. In other words, the invention makes quality of service fee differentiation for a packetized network viable despite the circumstance that the network could transport all packets with low delay.

Again, the technique according to the invention is especially useful for networks or connections with light or moderate traffic load where different transport services experience similar delays. It permits a network operator or access provider to extend low cost transport services only for delay tolerant traffic and induce users to subscribe to or use additional or alternative value added transport service levels for their delay sensitive traffic. As an example, the transport services offered to an access subscriber could be segmented as follows: large delay for large file transfers and Email; medium delay for interactive transfers such as world wide web (WWW) traffic; and small delay for interactive video, IP telephony and teleconferencing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit of the present invention, and wherein:

FIG. 4 is a flowchart depicting the process implemented by the embodiment of FIG. 2;

FIG. 5b depicts fields of a higher level packet encapsulated in the lower level packet of FIG. 5a;

FIG. 8b depicts a higher level packet encapsulated in the lower level packet of FIG. 8a.

DETAILED DESCRIPTION OF THE PREFERRED EMBODIMENTS

Figure 1:
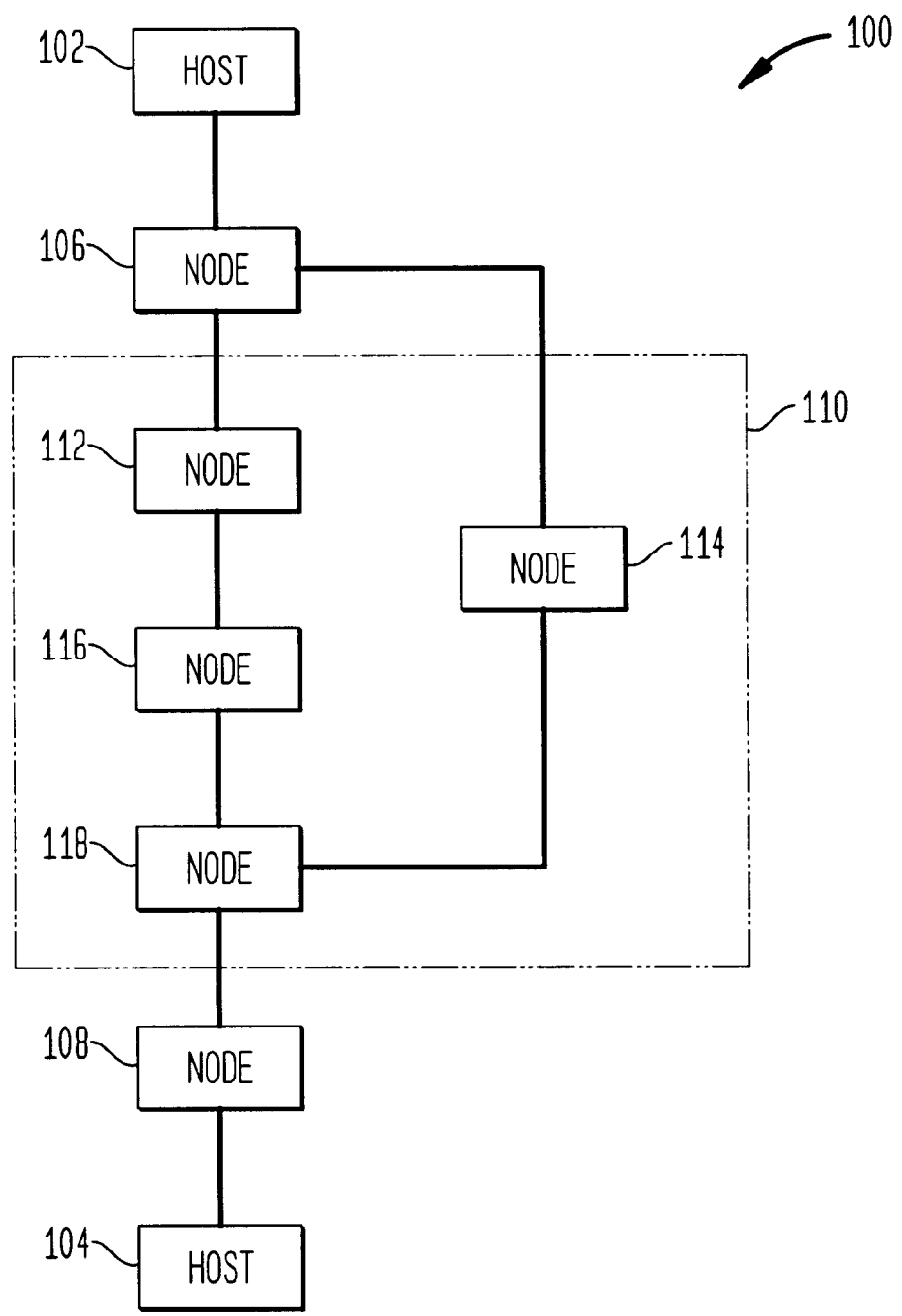
FIG. 1 is schematic block diagram of locations in a packetized network where the invention can be located.

FIG. 1 depicts a block diagram of a packetized network 100 to which host devices 102 and 104 are connected so as to communicate with each other. A first path from the host 102 to the host 104 passes through a node 106, a node 112, a node 116, a node 118, and a node 108. A second path passes through a node 106, node 114, node 118, and node 108. The nodes 112, 114, 116, and 118 have been enclosed in a dashed line 110, which is intended to emphasize those nodes in the network 100 that are indirectly connected to the hosts 102 and 104, respectively.

Each of the nodes 106, 108, 112, 114, 116, and 118 can be implemented by wellknown router technology, i.e., software being run by a general processor and/or specialized hardware such as an Application Specific Integrated Circuit (ASIC).

Inspection of FIG. 1 reveals that the forms of the invention can be located in a great variety of positions in the packetized network 100. The node 106 is well positioned to monitor, and if necessary delay, packets being originated by the host 102 and/or packets that are intended to be received by the host 102. Similarly, the node 108 is well positioned to monitor, and if necessary delay, packets originated by the host 104 and/or that are intended to be received by the host 104. The node 118 is very comparably situated to the node 108. The nodes 112, 114, and 116 will have a lower probability of being able to monitor, and if necessary delay, all of the packets associated with the host 102 or the host 104. As such, the locations of the nodes 106, 108 and 118 are preferred. Depending upon the location, the invention can monitor packets relevant to one or many users.

The invention is also applicable to multicast packet streams having one sender and multiple receivers, which is often used for video transmissions. Multicasting raises the circumstance in which a user can be represented by multiple destination addresses.

Figure 2:
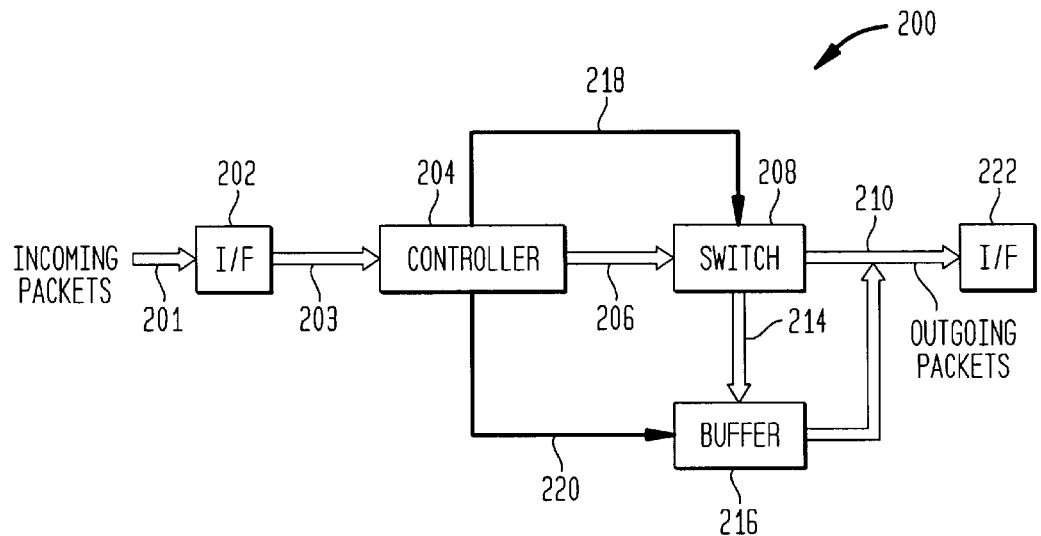
FIG. 2 is a schematic block diagram of an embodiment according to the present invention.

FIG. 2 depicts a schematic block diagram of an embodiment 200 according to the invention. The embodiment 200 includes an interface 202 for receiving incoming packets over a connection 201. The interface 202 provides the incoming packets to the controller 204 over the connection 203. The controller 204 provides packets to the switch 208 over the connection 206. In addition, control signals are provided from the controller 204 to the switch 208 via the connection 218. The switch 208 selectively outputs outgoing packets over a connection 210 to the packetized network 100 or to a host 102 or 104 via an interface 222, depending upon whether the embodiment 200 is located at the positions of the nodes 106, 108 and 118 and further depending upon whether the embodiment 200 is configured to operate on packets originated by the host 102 or 104 or intended to be received by the host 102 and 104. The switch 208 also selectively provides packets to the buffer 216 via a connection 214. The buffer 216 provides buffered packets to the interface 222 and is controlled by signals provided from the controller 204 over the connection 220.

FIG. 2 could be implemented by a commercially available router. Also, excluding the interfaces 202 and 222, which can be, e.g., Ethernet interfaces, the embodiment 200 can be implemented as software being run on a computer based, e.g., upon a PENTIUM processor marketed by INTEL Corporation, although a lower performance processor could be used depending upon the location of the invention in the network. Alternatively, the embodiment 200 could be implemented in an Application Specific Integrated Circuit (ASIC). Further in the alternative, the embodiment 200 could be represented by an article of manufacture (software) that is intended to be run on a suitable processor. The software could be embodied on a memory medium or could be a propagated signal, perhaps modulated onto a carrier wave.

The buffer 216 can be random Access Memory (RAM) on the motherboard where the implementation is a processor running software. In contrast, if the implementation is an ASIC, the buffer 216 can be RAM on the same integrated circuit as the processing architecture that carries out the functions of the controller 204.

An example of the calculation of the size of the buffer 216 follows. Let R be the rate of incoming data (including packet overhead) and Dmax be an upper bound on the packet delay D. The required memory buffers size is B<R*Dmax. For a Voice Over Internet Protocol (VoIP) stream generated by an eight kilobits per second (kbps) voice encoder (vocoder) (not depicted), assume a 20 ms interpacket time and forty bytes of overhead per packet. Set the desired delay parameter to Dmax=300 ms. Then, R=8+(40*8)/20=24 kbps, B=R*Dmax=24*300=7.2 kbps=0.9 kBytes. For n=200 simultaneous real-time voice connection, B'=n*B=200*0.9= 180 kBytes. Thus, for the example, the buffer size is 180 kilobytes.

When determining buffer size, one can consider whether the non-compliant packets are likely to be generated during a time of congestion in the network. If so, then the unavoidable delay associated with a congested network might decrease the amount of artificial delay that is necessary or might obviate the need to artificially delay the packet. In this situation, the size of the buffer can be significantly reduced.

In general, the buffers in the embodiments 200 and 300 can be managed by the controllers 204 and 302, respectively, according to any of the well known buffer management techniques, such as First-In-First-Out (FIFO) or Round-Robin.

Figure 3:
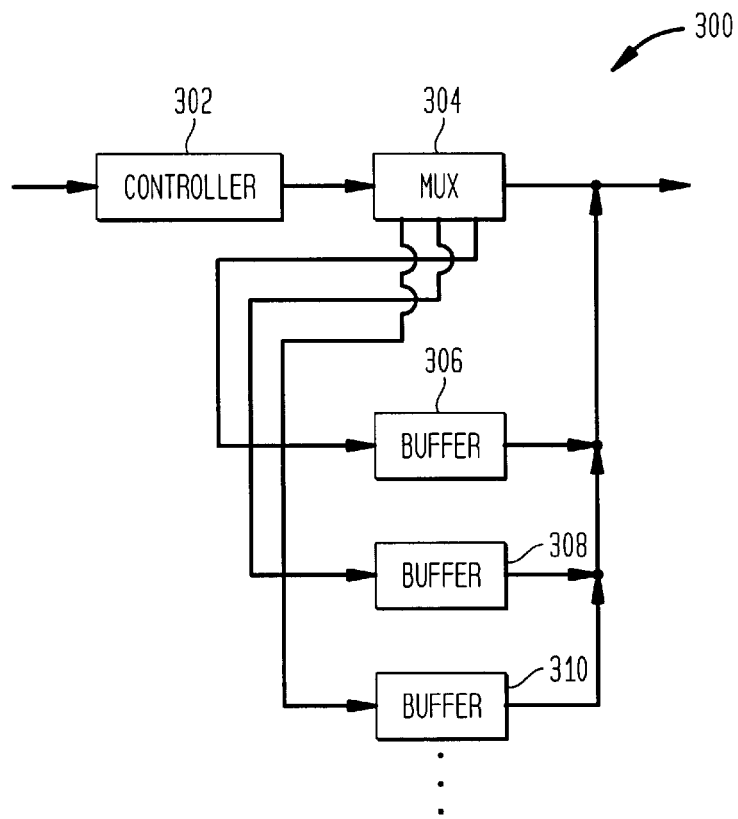
FIG. 3 is an abbreviated schematic block diagram of an alternative embodiment to FIG. 2.

FIG. 3 depicts a simplified, relative to FIG. 2, schematic of a second embodiment 300 of the invention. The embodiment 300 includes a controller 302 that corresponds to the controller 204 and a multiplexer that corresponds to the switch 208. Plural buffers, of which three (306, 308, and 310) have been depicted, as an example, are connected to the multiplexer 304. Packets are selectively diverted by the multiplexer 304 to the buffers 306, 308, and 310 under the control of the controller 302, or the buffers 306, 308 and 310 are bi-passed entirely.

FIG. 4 depicts the process implemented by the embodiments according to the invention, but for simplicity will be described in terms of the first embodiment 200. The process 400 starts at 402 and proceeds to step 403. In step 403, packets are received by the interface 202.

The controller 204 first inspects fields within the packet to identify the user associated with the packet. As an example, assuming the user of interest is host 104, if the invention were located in mode 108 of FIG. 1, to identify the user, the controller 204 would examine the destination address field if the packet were received from the node 108 and would examine the source address field if the packet were received from the host 104. The controller 204 can also examine a flow identifier field that associates a packet with, among other things, a source address or a destination address.

Each received packet also has at least one parameter that is indicative of the transport service or quality of service that the packet requires. In step 404, the controller 204 compares at least one such parameter of the received packets against a list of values that is representative of the transport service election, or quality of service election, made previously by the user. In addition to the presence of certain parameters (or fields) in the received packets, the absence of certain other parameters (or fields) in the received packets can also be indicative of the type of transport service required by the packet.

In step 406, the controller 204 determines whether the packet under consideration complies with the service election made by the user. If not, then, at step 408, the controller 204 causes the non-compliant packet under consideration to be delayed, e.g., in the buffer 216. After the delay, the controller 204 forwards the non-compliant packet to its destination in step 410. The controller 204 also ensures that the buffer does not output packets simultaneously with the switch as this would lead to a collision. If the packet under consideration is determined to comply with the user's election of services, then step 408 is skipped and the compliant packet is forwarded toward its destination at step 410. After step 410, the processing ends at step 412.

The first form of the invention, discussed in the Summary Section, corresponds to the steps 403–406 of the flowchart of FIG. 4. In other words, the first form identifies packets for which the required transport service does not comply with the preexisting transport service election. The first form can be implemented by the first or second embodiment. The first form, however, would not require the switching/multiplexing and buffering aspects of the first and second embodiments. Rather, the controller 206 would be directly connected to the interface 222. The second form of the invention, discussed in the Summary Section, corresponds to all of the steps in FIG. 4 and can also be implemented by the first or second embodiment.

Figure 5A:
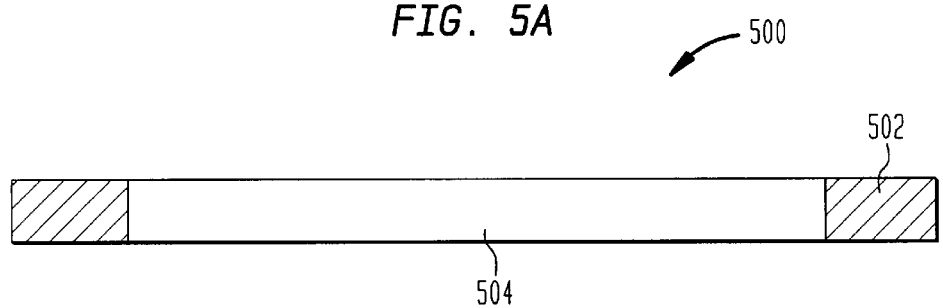
FIG. 5a depicts a typical packet.

The comparison step 404 and the determination step 406 of FIG. 400 will now be discussed in more detail. Packets typically include a great deal of information in addition to pure data. This information is usually included within a header that has a plurality of fields. FIG. 5a depicts a lower level protocol packet 500 in which a higher level packet 504 is encapsulated. The areas 502 correspond to information pertinent to the lower level protocol.

Figure 5B:
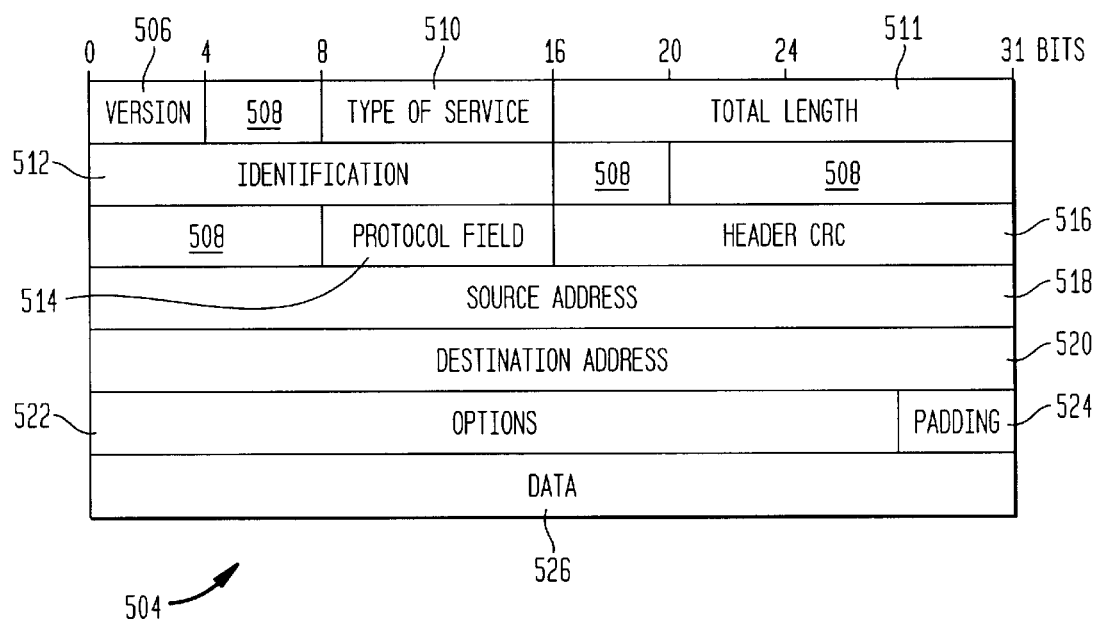

FIG. 5b depicts the encapsulated higher-level packet 504 in more detail. The encapsulated packet 504 conforms to the Internet Protocol Version 4 (Ipv4) standard and is 224 bits in length, but has been depicted in FIG. 5b for simplicity as seven stacked rows that are each thirty-two bits in length. For example, the end of the header CRC field 516 is to be understood as being contiguous with the beginning of the source address field 518.

The encapsulated packet 504 includes a version field 506, a type of service field 510, a total length field 511, an identification field 512, a protocol field 514, a header CRC field 516, a source address field 518, a destination address field 520, an options field 522, a padding field 524, and a data field 526 that is variable in length (of which only 32 bits have depicted in FIG. 5B). In addition, there are other fields which are less relevance to the invention, and they have been identified by item number 508. The IPv4 standard permits additional optional fields to be added to the header and this is indicated through the use of the options field 522.

Figure 6:
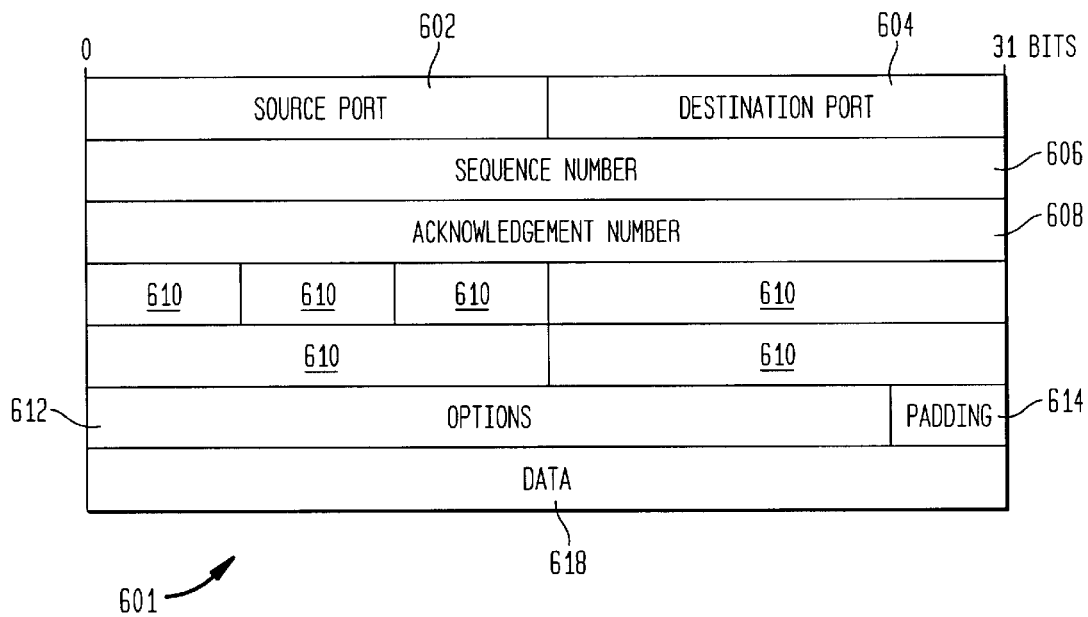
FIG. 6 depicts fields of a packet encapsulated in the data field of FIG. 5b.
Figure 7:
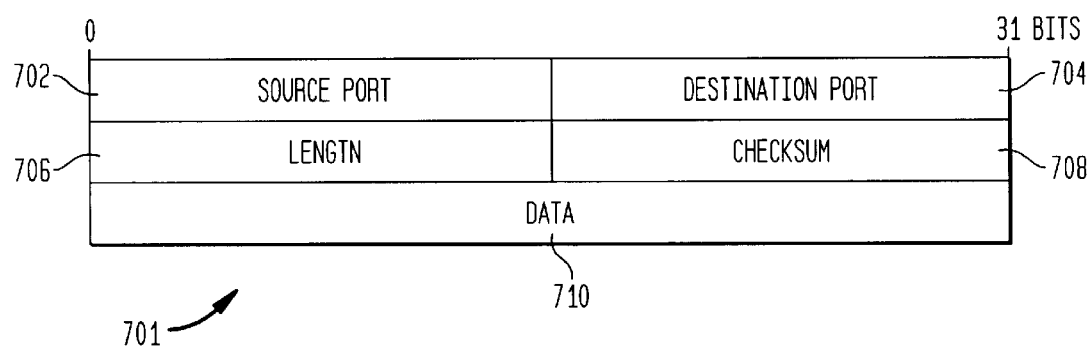
FIG. 7 depicts an alternative data packet encapsulated in the data field of FIG. 5b.

The encapsulated packet 504 of FIG. 5b can itself encapsulate a higher level protocol packet, two examples of which are depicted in FIGS. 6 and 7. The protocol field 514 indicates, e.g., whether the encapsulated packet 504 in the data field 526 conforms to the Transfer Control Protocol (TCP) or the User Datagram Protocol (UDP).

FIG. 6 depicts the situation in which the encapsulated packet 526 is a TCP packet 601. The more relevant fields of the encapsulated TCP packet 526 are the source port number field 602, the destination port number 604 the sequence number field 606, the acknowledgement number field 608, the options field 612, the padding field 614, and the variable length data field 618. Fields of lesser relevance to the invention have been denoted by item number 610. Similar to IPv4, TCP permits additional optional protocol header fields to be added.

FIG. 7 depicts the circumstance in which the encapsulated packet 526 is a UDP packet 701. The encapsulated packet 526 of FIG. 7 includes a source port field 702, a destination port number field 704, a length field 706, a check sum field 708, and a variable length data field 710.

As stated previously, the controller 204 compares at least one parameter of a received packet against a list of reference values representative of the user's service election. Such parameters correspond to the type of service field 510, the protocol field 514, the source address field 518, and the destination address field 520 of the encapsulated packet 504 of FIG. 5b. In addition, these parameters can also correspond to the source port number field 602 and 702, and the destination port number field 604 and 704 of FIGS. 6 and 7, respectively.

As an example, the controller 204 might inspect the protocol field 514 and, if its value indicates the existence of a TCP or UDP packet, then the controller 204 might inspect the source port number field 602/702 and/or the destination port number field 604/704. The fields 602/702 and 604/704 represent a mapping of the packet to the source and destination application, respectively. The Internet Engineering Task Force (IETF) has established a list of assigned numbers which equates port numbers to services or applications. The value in the field 602/702 and/or 604/704 can be indicative that the packet is, e.g., a voice packet or video packet.

Also, for example, the type of service field 510 can indicate that the packet requires a higher priority. The magnitude of the value in the packet length field 706 can indicate whether the packet is merely an acknowledgement packet or a data packet. The options field 522 can indicate that the subsequent data has been encrypted, e.g., according to the well known IPsec standard. Since encryption hides higher level protocol information, such as that contained in headers 601 and 701, the device may take a restrictive approach and assume that all encrypted data is taken from the most delay sensitive transport service. The options field 522 together with fields 604, 511 and 602 or 604 indicates that the packet is a TCP acknowledgement packet. Delaying one or several acknowledgement packets will affect the sender's TCP flow control window, thus delaying the data.

The actual comparison by the controller 204 is preferably implemented via a look-up table (LUT) (not shown) in the memory of the controller 204. The LUT would have reference values corresponding to the above-mentioned fields of interest. These reference values would be determined based upon a user's preexisting transport service election or quality of service election. The controller 204 would take the contents of a field under consideration and apply them to the LUT. If there existed a corresponding entry in the LUT, then this parameter under consideration be treated as complying with the user's service election and is indicative that the packet under consideration is compliant with the user's service election.

An alternative implementation of the process steps 404–406 in FIG. 4 will be described. In addition to recognizing when a packet is truly non-compliant with the user's service election, there will be packets for which it is not possible to determine compliance. For sample, encryption of a packet may make it impossible in step 404 to inspect the fields of interest mentioned above. If so, then the alternative implementation of the step 406 will also delay a packet for which compliance is indeterminate or in question, i.e., a questionable packet.

Once the controller 204 has determined that a packet is non-compliant, or (optionally) questionable/indeterminate, then processing proceeds to step 408 in which the delay is determined. Again, real-time packets are delay sensitive. Introducing delay into the transport of such packets can degrade the quality of service perceived by the user. Such degraded service is considered to discourage similar non-compliant use. In other words, a user dissatisfied with the artificial-delay-induced poor quality of real-time (e.g., voice and/or video) packet transport service will be encouraged to elect a higher quality of service that will not suffer such delay. It is anticipated that the packetized network service provider will be able to charge a premium for the higher quality of service.

There are number of techniques to implement the delay. In FIG. 2, the delay is implemented by culling the non-compliant packets and transferring them via the switch 208 to the buffer 216 under the control of the controller 204. Alternatively, the buffer 216 could be eliminated, with the delay being produced by lengthening the path that the non-compliant packet takes to reach its destination. The path can be lengthened by using known deflection routing technology.

The path length can also be increased by introducing a closed loop. The controller 204 can send a non-compliant packet to another node such that the other node sends it back to the controller 204 through zero or more intermediate nodes. The controller 204 would then send the non-compliant packet through another loop or onto its intended destination.

File transfer packets and E-mail packets can tolerate delay of 10–30 seconds (before the TCP protocol times out). Packets associated with a directory look-up for an E-mail address can tolerate 1–10 seconds of delay. Packets representing an interactive website session, i.e., world wide web (WWW) traffic, can tolerate delay of about 1–10 seconds. In contrast, for voice packets, a delay on the order of 200 milliseconds produces a perceptible negative impact upon the user. Such a delay can also exaggerate jitter (the variance from the average delay). Interactive video packets can only tolerate a delay of about 100 milliseconds to 5 seconds, through broadcast video can tolerate larger delays.

If a precise duration of the delay is desired, then it is preferable to store non-compliant packets in the buffer 216. The controller 204 calculates the duration of the delay. The duration can be, for example: a fixed time T1; a variable time T2 that is a function of the time at which the packet is received (time of day, day of the week), instantaneous network load, source and/or destination address, time that the packet has already spent in the buffer, the nature of the required transport service (e.g., large delay for large file transfers and Email, medium delay for interactive transfers such as world wide web (WWW) traffic, and small delay for interactive video, IP telephony and teleconferencing), the particular user (i.e., different users are accorded different delays, e.g., depending upon the number of instances and/or quality of non-compliance) and/or any of the other fields within the packet as discussed above; a random time T3; or a combination of the times T1, T2, and T3, so long as that combination did not exceed a maximum delay constraint T4. The upper bound T4 is chosen so that the added delay will not effect non-real-time packets in a way that is detrimental to the user.

An example of a delay calculation follows. Let P1 and P0 be fixed time intervals. Let P2 be the time of the day, ($0 \leq P2 \leq 24$). Let P3 be the day of the week ($1 \leq P3 \leq 7$). Let P4 be the time that the packet has already spent in the buffer. First, the duration D of the delay is set to P0, D=P0. Second, if $7 \leq P2 \leq 19$ and $P3 \leq 6$, i.e., if during office hours, then D=max(0, D+rand(P1–P4)), else D=max(0, rand(P1–P4)). The function rand(X) could, e.g., generate a uniformly distributed value between 0 and X. Where the packet is identified as a voice packet (e.g., based upon confirming that a UDP packet encapsulates a Real Time Protocol (RTP) packet), the values P0 and P1 can be adaptively set to 100 ms and 200 ms, respectively.

A more recent version of the Internet Protocol is the Internet Protocol Version 6 (IPv6). The IPv6 standard provides prioritization that prefers asynchronous (2-way without delay) packet streams. In addition, IPv6 enables the labeling of packets belonging to a particular traffic flow for which the sender requests special handling. Again, this aids in the support of specialized traffic such as real-time, voice packets, and video packets.

Figure 8A:
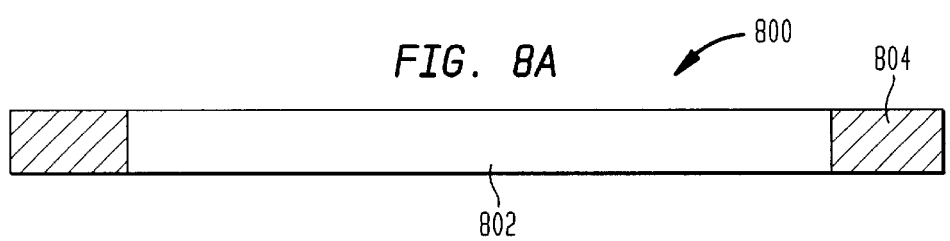
FIG. 8a depicts a second example of a packet.
Figure 8B:
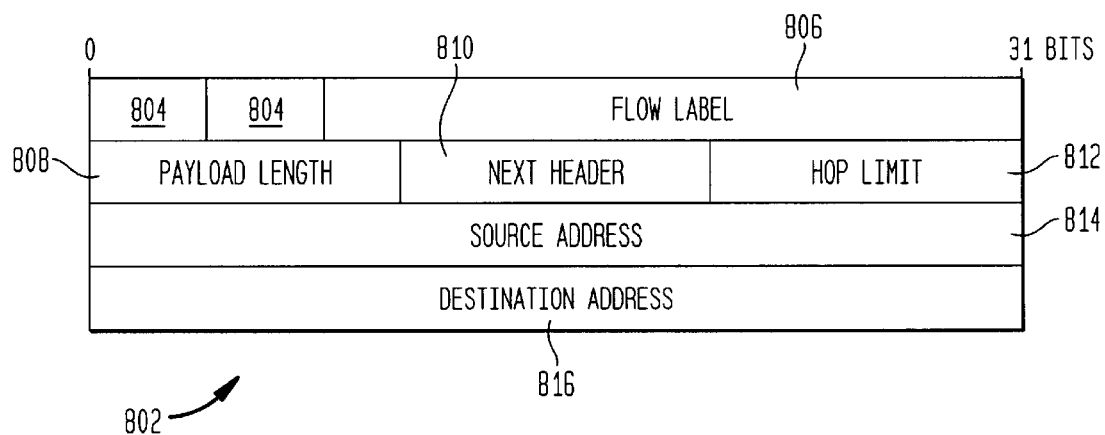

The controller 204 or 302 can be configured to inspect IPv6 packets. FIG. 8*a* depicts a packet 800 in which an IPv6 packet 802 is encapsulated within a lower level protocol 804. FIG. 8*b* depicts the encapsulated IPv6 packet 802 in greater detail as including a flow label field 806, a payload length field 808, a next header 810, a hop limit field 812, a source address field 814, and a destination address field 816. Fields of lesser relevance to the invention are indicated by item number 804. The controller 204 preferably inspects at least one parameter corresponding to the flow label field 806, the next header field 810, the source address field 814, and the destination address field 816, in a manner similar to that described above.

Another alternative implementation of step 408 is to selectively delay some of the non-compliant packets. In other words, the controller 204 can set the delay of certain non-compliant packets to zero. For example, if 10% of a packetized telephony or video transmission were delayed, then a user would still perceive a degradation in service quality.

Telephony and video applications buffer received packets until a minimum number or set are/is received. If a negligible number of packets of the expected minimum number are not received, the application might be capable of treating the yet-to-arrive packets as dropped packets and regenerating them via interpolation. However, if more than a negligible number of packets are not received, then the application will buffer the set until the missing packets arrive.

The alternative implementation of step 408 delays enough of the non-compliant packets (e.g., 10%) so that the recipient application will buffer the received set rather than attempt interpolation. Such buffering by the recipient application will translate to the desired perception of degraded service on the part of the user. The advantage of alternative step 408 is that it minimizes the size of the buffer 216 that is needed. However, the disadvantage is that, if not enough packets are delayed, then the non-compliant user might not be sufficiently discouraged from continuing the non-compliant behavior. The fraction of non-compliant packets that actually should be delayed represents a balance between hardware cost and the effectiveness of the discouragement, and will vary upon the circumstances to which the invention is applied.

An alternative implementation of buffering is to automatically buffer all received packets and then make a determination of which buffered packets can be released. In other words, only the non-compliant packets would be retained in the buffer for a delay calculated as described above.

The operation of FIG. 3 will now be discussed. The embodiment 300 of FIG. 3 is directed toward the circumstance in which there are at least three types of non-compliant service that are expected to be detected by the controller 302. The first type of non-compliant packets are stored in the buffer 306, the second type are stored in the buffer 308, and the third type are stored in the buffer 310. The controller 302 controls the multiplexer (MUX) 304 to selectively route the non-compliant packets to the appropriate buffer. For example, each packet in the buffer could be assigned the same duration of delay and each buffer could be managed on a first-in-first-out (FIFO) basis.

A third form of the invention can, again, be embodied by either of the embodiments of example FIGS. 2 and 3. The third form of the invention is less sophisticated than the first two forms. Again, for simplicity, the third form of the invention will be explained in terms of FIG. 2. The interface 202 receives packets. The controller 204 then determines which of the received packets belong to a user under consideration who has a preexisting quality of service election.

The controller 204 then uses the buffer 216 to buffer at least a predetermined fraction, e.g., 10% of the packets associated with the user under consideration. Alternatively, all of the packets associated with the user could be buffered. Buffering all packets has the advantage of being a stronger incentive (discouragement) to a non-compliant user, but has the disadvantage of requiring more buffer capacity, i.e., being more expensive.

The delay used by the third form of the invention is chosen to not degrade the quality of the transport service received by the user for those packets that comply with the service election.

If the third form of the invention is implemented by the second embodiment of example FIG. 3, then the buffers 306, 308 and 310 can be used to buffer the packets of different users.

For simplicity, the invention has been described in terms of the Internet and the IPv4 and IPv6 protocols. However, the invention is applicable to any packetized network, be it a wireless network, a local area wired network, or a local-area or wide-area wired network such as the Internet and the various associated protocols. Also, many other protocols embed information in the packets which could be inspected according to the invention for the purposes of deciding when a packet is not in compliance with a user's service selection. An alternative, and sometimes a complement to, the Ipv4 or Ipv6 protocols is the asynchronous transfer mode (ATM) protocol. For example, the fields (not depicted) of an ATM packet that are of greatest relevance to the invention are the virtual path identifier field, the virtual channel identifier field, the information type field, the cell loss priority field and the generic flow control field. Additional higher level protocols, which may have parameters that specify transport service requirements, are the File Transfer Protocol (FTP), the Hypertext Transfer Protocol (HTTP) or Real Time Protocol (RTP).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for monitoring whether use of a packetized network is commensurate with a preexisting transport quality of service election designated for a user, the method comprising:

receiving packets associated with said user, said packets at least one of having or omitting at least one parameter indicative of a transport quality of service required by said packets; and identifying ones of said packets for which said required transport quality of service does not comply with said preexisting transport quality of service election by comparing said at least one parameter of said received packets with a list of reference values representative of said preexisting transport of service election;

said at least one parameter corresponding to at least one of a field representing the destination address, a field representing a source address, a field representing a mapping to at least one of a source application and a destination application, a field representing a predefined flow of packets, a field representing a type of encapsulated higher level protocol, a field representing packet length, a field representing a type of service requested, and a field representing additional protocol options.

2. The method of claim 1, wherein said packets are received from said user.

3. The method of claim 1, wherein said user is an intended recipient of said packets.

4. The method of claim 1, further comprising:

identifying questionable ones of said packets for which compliance of said required transport service with said preexisting transport service election is indeterminate.

5. A method for selectively discouraging use of a packetized network that is not commensurate with a preexisting quality of service election that has been made by a user, the method comprising:

receiving packets associated with said user, said packets at least one of having or omitting at least one parameter indicative of a quality of service required by said packets;

determining ones of said packets for which said required quality of service does not comply with said preexisting quality of service election; and selectively delaying arrival of at least a predetermined fraction of the non-compliant packets at the respective destinations thereof by durations, respectively, sufficient to discourage similar non-compliant use of said packetized network.

6. The method of claim 5, wherein said packets are received from said-user.

7. The method of claim 5, wherein said user is an intended recipient of said packets.

8. The method of claim 5, wherein said determining includes comparing said at least one parameter of said received packets with a list of reference values representative of said preexisting transport service election, and culling ones of said received packets for which said at least one parameter is inconsistent with said list of reference values.

9. The method of claim 8, wherein said at least one parameter corresponds to one of a field representing the destination address, a field representing a source address, a field representing a mapping to at least one of a source application and a destination application, a field representing a predefined flow of packets, a field representing a type of encapsulated higher level protocol, a field representing packet length, a field representing a type of service requested, and a field representing additional protocol options.

10. The method of claim 5, wherein said delaying includes buffering said non-compliant packets in a memory.

11. The method of claim 5, wherein, for said delaying, said sufficient duration is achieved by intentionally lengthening a route of said non-compliant packets to said respective destinations.

12. The method of claim 11, wherein said lengthening includes sending the packet under consideration through a closed loop at least once.

13. The method of claim 5, wherein each one of said durations is determined as a function of said required quality of service.

14. The method of claim 13, wherein each one of said durations is determined as a function of the point in time at which the non-compliant packet is received.

15. The method of claim 5, further comprising:

identifying questionable ones of said packets for which compliance of said required transport service with said preexisting transport service election is indeterminate; and selectively delaying arrival of at least a predetermined fraction of the questionable packets at the respective destinations thereof by durations, respectively, sufficient to discourage similar questionable use of said packetized network.

16. The method of claim 5, wherein each one of said durations is determined as a function of a random number.

17. The method of claim 5, wherein each one of said durations is determined as a function of instantaneous congestion in said packetized network.

18. A device for monitoring whether use of a packetized network is commensurate with a preexisting transport quality of service election designated for a user, the device comprising:

an interface to receive packets associated with said user, said packets at least one of having or omitting at least one parameter indicative of a transport quality of service required by said packets; and a processor operative
to identify ones of said packets for which said required transport quality of service does not comply with said preexisting transport quality of service election and
to compare said at least one parameter of said received packets with a list of reference values representative of said preexisting transport quality of service election:
said at least one parameter corresponding to one of a field representing the destination address, a field representing a source address, a field representing a mapping to at least one of a source application and a destination application, a field representing a predefined flow of packets, a field representing a type of encapsulated higher level protocol, a field representing packet length, a field representing a type of service requested, and a field representing additional protocol options.

19. The device of claim 18, wherein said packets are received from said user.

20. The device of claim 18, wherein said user is an intended recipient of said packets.

21. The device of claim 18, wherein said processor is also operable o identify questionable ones of said packets for which compliance of said required transport service with said preexisting transport service election is indeterminate.

22. A device for selectively discouraging use of a packetized network that is not commensurate with a preexisting quality of service election that has been made by a user, the device comprising:
an input interface to receive packets associated with said user, said packets at least one of having or omitting at least one parameter indicative of a quality of service required by said packets;
a controller connected to said input interface and operative to
determine ones of the received packets for which said required quality of service does not comply with said preexisting quality of service election, and
selectively delay arrival of at least a predetermined fraction of the non-compliant packets at the respective destinations thereof by durations, respectively, sufficient to discourage similar non-compliant use of said packetized network;
a switch responsive to said controller; and
a memory, responsive to said controller, to buffer said filtered packets;
said controller further being operative to
compare said at least one parameter of said received packets with a list of reference values representative of said preexisting quality of service election, and
control said switch to selectively divert at least a predetermined fraction of ones of said received packets, for which said at least one parameter is inconsistent with said list of reference values, to said memory.

23. The device of claim 22, wherein said packets are received from said user.

24. The device of claim 22, wherein said user is an intended recipient of said packets.

25. The device of claim 22, wherein said at least one parameter corresponds to one of a field representing the destination address, a field representing a source address, a field representing a mapping to at least one of a source application and a destination application, a field representing a predefined flow of packets, a field representing a type of encapsulated higher level protocol, a field representing packet length, a field representing type of service requested, and a field representing additional protocol options.

26. The device of claim 22, further comprising a memory.

27. The device of claim 22, wherein said controller is operative to determine each one of said durations as a function of said required quality of service.

28. The device of claim 27, wherein said controller is operative to determine each one of said durations as a function of the point in time at which the non-compliant packet is received.

29. The device of claim 22, wherein each one of said durations is determined as a function of instantaneous congestion in said packetized network.

30. A device for selectively discouraging use of a packetized network that is not commensurate with a preexisting quality of service election that has been made by a user, the device comprising:
an input interface to receive packets associated with said user, said packets at least one of having or omitting at least one parameter indicative of a quality of service required by said packets; and
a controller connected to said input interface and operative to
determine ones of the received packets for which said required quality of service does not comply with said preexisting quality of service election, and
selectively delay arrival of at least a predetermined fraction of the non-compliant packets at the respective destinations thereof by durations, respectively, sufficient to discourage similar non-compliant use of said packetized network by intentionally lengthening a route of said non-compliant packets to said respective destinations.

31. The device of claim 30, wherein said lengthening includes sending the packet under consideration through a closed loop at least once.

32. A device for selectively discouraging use of a packetized network that is not commensurate with a preexisting quality of service election that has been made by a user, the device comprising:
an input interface to receive packets associated with said user, said packets at least one of having or omitting at least one parameter indicative of a quality of service required by said packets; and
a controller connected to said input interface and operative to
determine ones of the received packets for which said required quality of service does not comply with said preexisting quality of service election,
selectively delay arrival of at least a predetermined fraction of the non-compliant packets at the respective destinations thereof by durations, respectively, sufficient to discourage similar non-compliant use of said packetized network
identify questionable ones of said packets for which compliance of said required transport service with said preexisting transport service election is indeterminate, and
delay arrival of the questionable packets at the respective destinations thereof by durations, respectively, sufficient to discourage similar questionable use of said packetized network.

33. A device for selectively discouraging use of a packetized network that is not commensurate with a preexisting quality of service election that has been made by a user, the device comprising:

an input interface to receive packets associated with said user, said packets at least one of having or omitting at least one parameter indicative of a quality of service required by said packets; and a controller connected to said input interface and operative to determine ones of the received packets for which said required quality of service does not comply with said preexisting quality of service election, and selectively delay arrival of at least a predetermined fraction of the non-compliant packets at the respective destinations thereof by durations, respectively, sufficient to discourage similar non-compliant use of said packetized network, each one of said durations being determined as a function of a random number.

34. A computer program embodied in a computer-readable medium, for monitoring use of a packetized network that is not commensurate with a preexisting transport-delay quality of service election that has been made by a user, said computer program embodied in said computer-readable medium comprising:

an interface program code segment to cause packets associated with said user to be received, said packets at least one of having ore omitting at least one parameter indicative of a transport-delay quality of service required by said packets;

a comparison program code segment to determine ones of the received packets for which said required transport-delay quality of service does not comply with said preexisting transport-delay quality of service election; and a delay program code segment to selectively cause delayed arrival of at least a predetermined fraction of the non-compliant packets at the respective destinations thereof by durations, respectively, sufficient to discourage similar non-compliant use of said packetized network.

* * * * *